UNITED STATES PATENT OFFICE.

DOMINGO MOTTA, OF GENOA, ITALY, ASSIGNOR OF TWO-THIRDS TO EDOARDO RUGIU AND ANTONIO VILLAIN, OF GENOA, ITALY.

PLASTIC MATERIAL PRACTICALLY INCOMBUSTIBLE, STRONG, AND POSSESSING INSULATING PROPERTIES.

1,331,519.     Specification of Letters Patent.     Patented Feb. 24, 1920.

No Drawing.     Application filed July 23, 1919. Serial No. 312,856.

*To all whom it may concern:*

Be it known that I, DOMINGO MOTTA, subject of the King of Italy, residing at Genoa, Italy, have invented certain new and useful Improvements in Plastic Material Practically Incombustible, Strong, and Possessing Insulating Properties, of which the following is a specification.

The subject of the present invention is a new plastic material practically incombustible, strong and possessing insulating properties, and adapted to replace advantageously various materials employed hitherto for the production of a large number of objects of all forms and dimensions presenting a series of reliefs or ornaments, etc.

The plastic properties of the said material permit of its use advantageously for reproducing industrial or artistic copies in substitution for plaster compositions, gelatine, paste and other substances, such as paste made from moist paper or layers of superposed paper known under the name of papier mâché, statuary pasteboard, and the like.

This plastic material, simply dipped in a solution of size or other similar substance permits of obtaining reproductions which are practically incombustible, finer, more homogeneous and lighter than those obtained in other ways. The same result may be obtained by pressing the said plastic material in dry condition in suitable molds.

The material may be used to form partitions or electrical insulating layers by shaping them to the body with which they are to be brought in contact.

With the new product forming the subject of the present invention walls and impermeable sheets may be made; it is sufficient for this purpose to cover the mass with the latter or coat the said mass with appropriate varnishes.

In addition, although the new material cannot always be used in substitution for sheets of asbestos, it may nevertheless in the majority of cases, thanks to its property of being practically incombustible, be employed in any suitable manner in lieu of and in place of such sheets, and is less costly and more plastic.

One of the numerous applications of the said material, which has given excellent results is that in which it is employed in the form of blank matrices used in stereotype graphic reproductions, because its strength permits of limiting exclusively the overlaying operations in large blank spaces; on the other hand its plasticity permits of obtaining clearer reproductions and due to its elasticity its use reduces the wear of the printing characters on which it is pressed. It is to be noted that in addition it is ready immediately for use in various operations either for reproductions in dry state or in a moist state; in the first case the material is moistened and then pressed; in the second case it is only pressed; in both cases a blank matrix is obtained which is more flexible than that usually obtained and affords the very appreciable advantages mentioned above.

The new material is obtained by combining about equal weights of paper paste of an elastic nature without size with a composition of calcium carbonates and magnesium silicates in about equal volumetric proportions. With this mixture sheets or strips of variable thickness are formed as desired either to be subjected to the imprint of characters after having been moistened or in dry condition.

The new material forming the subject of the invention may also be obtained by superposing on a suitable elastic substance such as paper, cardboard, or the like the said carbonates and silicates in lieu of incorporating them in the material.

What I claim is:

1. A new plastic material practically incombustible, strong, elastic and having insulating properties comprising paper paste without size and equal parts by volume of calcium carbonate and magnesium silicate, the weight of the combined carbonate and silicate being substantially the same as the paper paste.

2. A method of making insulating material consisting in mixing paper paste without size and equal parts by volume of calcium carbonate and magnesium silicate, the weight of the carbonate and silicate being substantially equal to that of the paper paste.

In testimony whereof I affix my signature in presence of two witnesses.

DOMINGO MOTTA.

Witnesses:
    ALESSANDRO RIGHI,
    WILLIAM P. SHOCKLEY.